United States Patent [19]

Hammel

[11] 4,298,370

[45] Nov. 3, 1981

[54] METHOD OF IMPROVING GLASS MELTING BY ABLATION ENHANCEMENT

[75] Inventor: Joseph J. Hammel, O'Hara Township, Allegheny County, Pa.

[73] Assignee: PPG Industries, Inc., Pittsburgh, Pa.

[21] Appl. No.: 155,802

[22] Filed: Jun. 2, 1980

[51] Int. Cl.³ .................. C03B 1/00; C03B 3/00; C03B 5/235

[52] U.S. Cl. .................. 65/27; 65/135; 432/5

[58] Field of Search ............... 65/27, 134, 135, 335; 264/118, 119; 106/DIG. 8; 414/165, 166; 432/5, 87

[56] References Cited

U.S. PATENT DOCUMENTS

| | | | |
|---|---|---|---|
| 1,916,262 | 7/1933 | Good | 414/166 |
| 2,214,191 | 9/1940 | Batchell et al. | 65/335 X |
| 2,294,373 | 9/1942 | Batchell | 65/27 |
| 2,327,887 | 8/1943 | Halbach et al. | 432/5 |
| 2,533,826 | 12/1950 | Lyle | 414/166 X |
| 2,578,110 | 12/1951 | Tooley | 65/136 |
| 2,749,666 | 6/1956 | Baque | 65/134 X |
| 2,829,784 | 4/1958 | Henry et al. | 414/166 |
| 3,127,033 | 3/1964 | Lyle | 414/166 |
| 3,193,119 | 7/1965 | Blaine | 414/166 |
| 3,233,022 | 2/1966 | Henry et al. | 264/123 |
| 3,325,268 | 6/1967 | Penberthy | 65/335 X |
| 3,637,365 | 1/1972 | Oulton | 65/134 |
| 3,780,889 | 12/1973 | Frazier et al. | 414/166 |
| 3,896,201 | 7/1975 | Mabru | 264/118 |
| 3,994,710 | 11/1976 | Schwenninger | 65/135 |
| 4,004,903 | 1/1977 | Daman et al. | 65/135 |
| 4,023,976 | 5/1977 | Bauer et al. | 65/27 X |
| 4,030,905 | 6/1977 | Hawkins | 65/135 |

Primary Examiner—Richard V. Fisher
Attorney, Agent, or Firm—Dennis G. Millman

[57] ABSTRACT

The rate of melting glass batch to a liquid state is improved by providing sloped surfaces on the batch to enhance run-off of liquid. The slopes may be provided by feeding batch as shaped aggregates, contouring the surface of a batch layer, or by creating openings through a batch layer. The batch may be compressed or compacted into aggregates before they are deposited as a single layer onto a pool of molten glass contained within a glass melting furnace.

17 Claims, 10 Drawing Figures

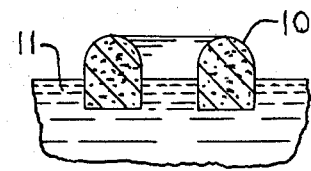
Fig.10
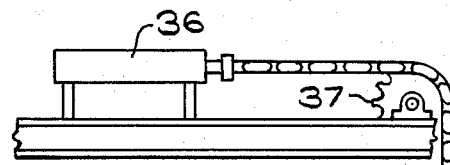
Fig.4
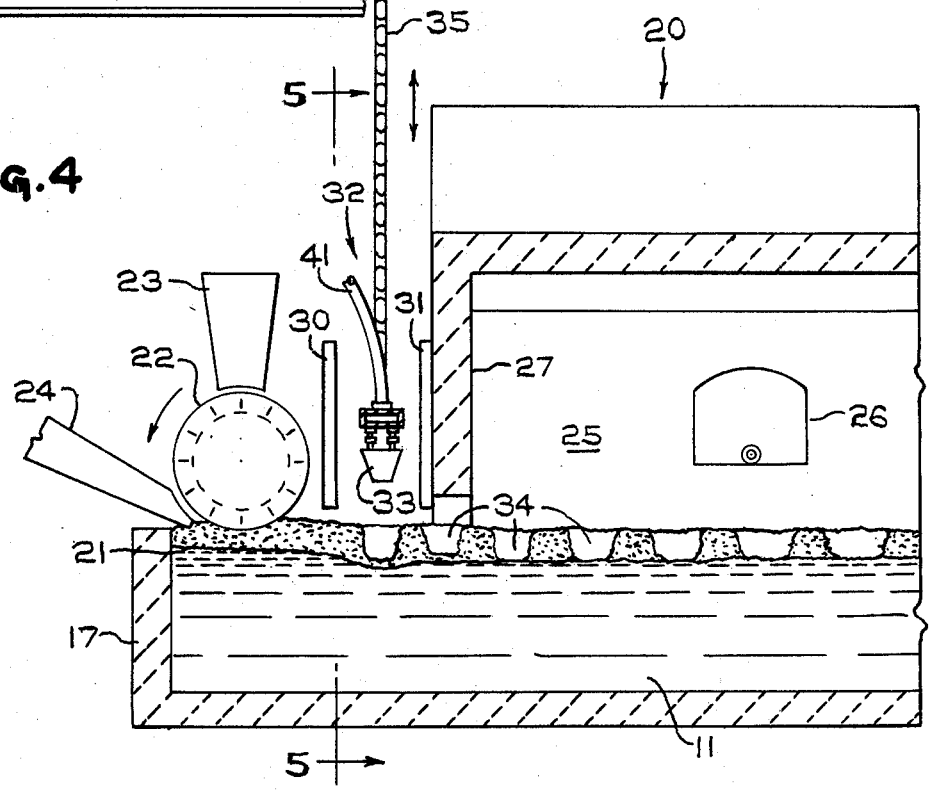
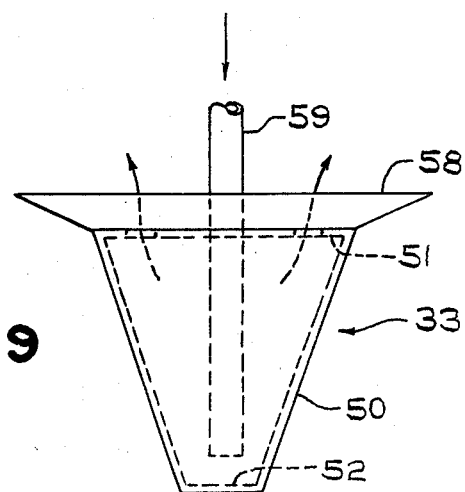
Fig.9

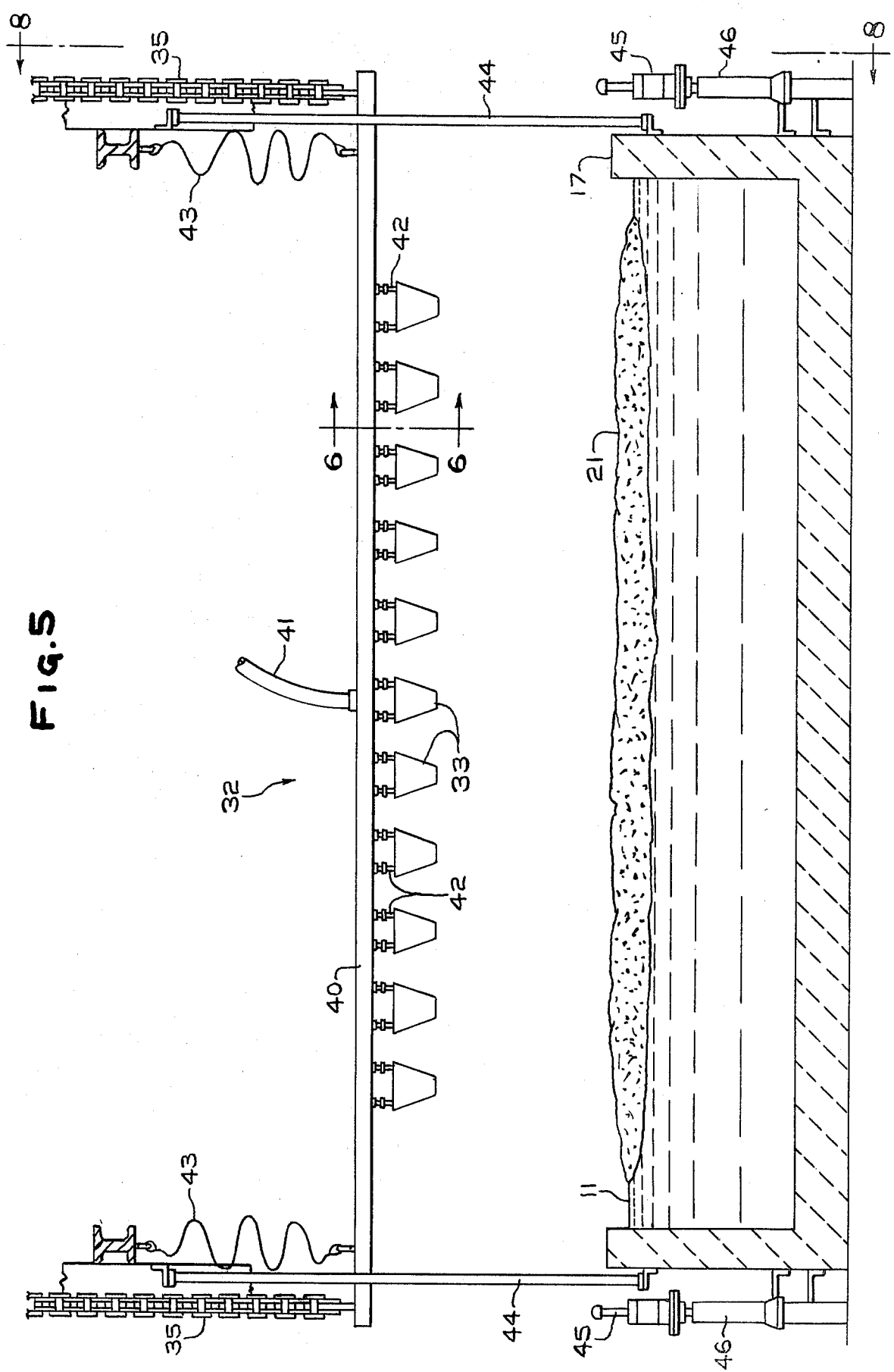

METHOD OF IMPROVING GLASS MELTING BY ABLATION ENHANCEMENT

BACKGROUND OF THE INVENTION

This invention relates to improvements in the rate of melting glass in a tank-type melting furnace whereby the output of a particular furnace may be increased at a given energy consumption, or, conversely, the energy consumption may be reduced for a given throughput. More particularly, the invention deals with improvements in the manner in which raw glass batch materials are fed to a glass melting furnace so as to enhance the rate the raw ingredients are brought to a liquid state.

In a typical glass melting furnace of the regenerative or recuperative type, a body of molten glass is maintained in the furnace and raw glass batch materials are fed through an inlet at one end of the furnace onto the surface of the pool of molten glass. There, the batch materials usually form an unmelted layer on the surface of the molten glass pool which may extend a considerable distance into the furnace until it becomes melted into the pool of molten glass. At the opposite end of the furnace, melted and reacted glass is withdrawn from the pool of molten glass through an outlet opening.

It has been recognized that the floating layer or blanket of unmelted batch ingredients acts as a thermal insulator which limits the rate at which the temperature of the batch is raised sufficiently to enter a liquid state. Therefore, liquefaction of glass batch usually is limited to a relatively thin layer at the surface of the batch blanket. In order to overcome this problem, attempts have been made in the past to increase the surface area of the batch blanket exposed to the flames in the furnace. For example, U.S. Pat. No. 4,030,905 shows an arrangement for plowing furrows transversely across a batch blanket. Such an arrangement may produce an increase in batch surface area and some slight improvement in run-off of melted batch, but possesses certain drawbacks. Plowing the furrows causes batch to be piled up more deeply on either side of each furrow, thereby further insulating the underlying batch from the overhead sources of heat. Furthermore, any enhancement in run-off by plowing is limited because the furrows do not extend to the underlying molten glass and because some of the loose batch material tends to fall back into the furrow behind the plow.

Another approach to breaking up a batch blanket is disclosed in U.S. Pat. No. 3,994,710 wherein an inverted T shaped member is employed to chop the batch blanket into pieces. Such an arrangement appears most suitable for a location relatively far into the furnace where melting of the batch blanket has already progressed to an advanced stage. It would be desirable to improve run-off as early as possible in the melting process. Additionally, by being located within the main body of the melting furance, the T bar of the patent requires cooling which detracts from any net thermal gains. Also, operating on the batch blanket within the main body of the furnace carries with it the risk of increased carry-over of materials which can have an adverse effect on the walls and regenerator or recuperator system of the furnace. However, carrying out such a chopping operation on an upstream portion of the batch blanket would not appear to be advantageous since the buoyant batch material would be pressed into the molten glass temporarily and then rise again.

Another prior art approach has been to bring the batch ingredients into more intimate contact with the molten glass such as in U.S. Pat. Nos. 2,533,826 and 2,749,666. The object of this approach is to take advantage of conductive heat from the molten glass, but it has now been found that the major source of heat (typically about seventy percent) for melting the batch is the overhead radiant heat from the combustion flames in the furnace. Therefore, covering the batch with molten glass can be disadvantageous in that it reduces the amount of radiant heat received by the batch. It would be desirable to increase rather than decrease the impingement of radiant energy on the batch materials.

Other attempts have been made to improve batch melting by reducing the thickness of the batch blanket such as in U.S. Pat. Nos. 2,327,887; 3,193,119; and 4,004,903. While reducing batch blanket thickness may generally be desirable, the approach in each of these patents has the drawback of reducing surface area exposed to overhead flames and inhibiting run-off of melted batch. Furthermore, in many commercial glass melting operations, a primary objective is to maximize throughput of a given furnace. In such a case, the batch blanket would already cover a maximum area and any reduction in batch blanket thickness would undesirably reduce the throughput of the furnace. The last mentioned patent overcomes this dilemma somewhat by compacting the batch blanket, but, nevertheless, a flat upper surface is the result.

It is also known to produce a plurality of discrete batch piles by employing a plurality of small batch feeders such as in U.S. Pat. No. 3,127,033. Such an approach appears to be quite limited as to throughput because of the small size of the inlets through which batch is fed.

Two types of batch feeders are in widespread commercial use in the glass industry. The first being the reciprocating tray type as shown in U.S. Pat. Nos. 1,916,262 and 3,780,889 and the second being the rotary type as shown in U.S. Pat. No. 2,829,784. The reciprocating tray type feeder inherently tends to form a series of ridges extending laterally across the batch blanket. However, these ridges are not as steep as would be desired for the sake of enhancing run-off nor do the furrows between the ridges provide a sufficiently free path for run-off. After melting of the batch blanket has progressed substantially, the ridges typically become separated into floating masses known as "logs." However, break-up of the batch blanket does not occur as early as would be desired. The rotary type feeder produces a nearly level batch blanket with only a shallow treadmark on the surface produced by the rotary feeder blades. Hence, the rotary type feeder is particularly characterized by poor run-off.

While the prior art appears to recognize some advantages for increasing the surface area of the batch blanket and for minimizing the thickness of the batch layer, these improvements have heretofore been implemented in embodiments which favor one of the improvements to the exclusion of the other. Furthermore, it appears that the prior art has not fully appreciated nor used the advantages attendant to enhancing runoff of melted material from a batch blanket.

SUMMARY OF THE INVENTION

It has now been found that a major rate determining step of the glass melting process is the ablation of the batch layer, i.e., the run-off of a thin melted layer to expose underlying unmelted batch. Although surface area available for heat transfer to the batch is an important parameter for determining the rate of melting, it has now been discovered, quite surprisingly, that the area available for run-off is even more important. Thus, the present invention is directed to improving the run-off of liquid material from the batch layer so as to improve the overall melting rate. This is accomplished by increasing the amount of sloped area on the upper surface of the batch blanket. Moreover, this contouring of the batch blanket is achieved in the present invention without increasing the thickness of portions of the batch layer and without requiring a reduction in the mass throughput of a glass melting furnace. This is accomplished by providing compacted, sloped surfaces on the batch layer. The most beneficial ablation enhancing affects have been found when the batch blanket is provided not only with a large proportion of sloped run-off areas, but also with a well distributed number of run-off openings extending substantially through the thickness of the batch blanket and into communication with the underlying molten glass. These run-off openings prevent a slow-down of the ablation affect due to the areas between the run-off slopes becoming filled with the melted liquid.

Ablation enhancement may be accomplished in a number of ways in accordance with the present invention. One approach is to feed molded shapes into the melting furnace. These shapes could be spheres, hemispheres, tetrahedrons, pyramids, cones, cubes, slabs, or the like, but it has been found particularly advantageous to employ a toroid shape. Since the primary purpose for these shaped aggregates of batch is to provide sloping surfaces for run-off rather than surface area, they should be sufficiently large to maintain their structural integrity for an appreciable time within the furnace. Therefore, the molded aggregates should be considerably larger than the units of agglomerated batch previously employed in the prior art (e.g., pellets and briquettes). On the other hand, the shaped aggregations should not be so large as to result in unmelted chunks traveling downstream into the furnace beyond the usual batch melting zone. Therefore, it would be preferred that the shaped aggregates have a height no greater than the usual thickness of a batch blanket. Conventional glass batch formulas, when slightly wetted with water or caustic soda solutions, can readily be molded to shapes having sufficient structural integrity. The wetted batch may be tamped slightly into a mold, or conventional briquetting or tabletting processes on an enlarged scale may be employed. In any case, the batch in the shaped aggregate will be compacted relative to a loosely fed batch blanket. The shaped aggregates may be fed into the melting furnace with a distribution that provides substantially an equivalent mass density of batch in the melting zone to that conventionally provided by the batch blanket. At the same time, interstices between the shaped aggregates should provide run-off openings to the underlying body of molten glass.

In a second embodiment of the invention, shaped conglomerates having sloped surfaces for enhancement of run-off are formed in situ at the inlet of the melting furnace, thereby avoiding the necessity of conveying and feeding pre-shaped aggregates to the melting furnace. The top surface of the batch blanket is imprinted with a pattern of shapes as it is being fed into the furnace. The shapes may be the hemispheres, pyramids, tetrahedrons, cones, or the like, and preferably toroids, as mentioned above. Impressing the shapes into the surface of the batch blanket entails compacting the batch so that the shapes have structural integrity and so that the thickness of the batch blanket is not increased. The shaping should extend substantially through the thickness of the batch blanket so as to create openings to the underlying molten glass between the shaped aggregates. The shaping may be carried out by pressing the batch with molding means at or near the location of delivery onto the molten glass pool in the inlet extension of a furnace. The molding means may be reciprocated to stamp the batch periodically or the molding means may be provided with rotary motion so as to also provide driving force for feeding the shaped batch blanket into the furnace. Shaping may take place over the molten glass if sufficient buoyant force is present, but preferably the shaping is carried out by pressing the batch between a stationary support and the molding means.

A third embodiment of the invention, which is preferred on the basis of practical adaptation to existing glass melting operations, entails producing holes in a batch blanket shortly after it has been fed into the furnace. The holes may be produced by a tapered member inserted into the batch so as to compact the batch on the walls of the openings produced. As a result, slopes and openings for run-off are produced without substantially increasing the thickness of the batch layer.

THE DRAWINGS

FIG. 5 is a schematic cross-sectional end view of the inlet extension of the melting furnace shown in FIG. 4, taken along line 5—5, showing a preferred embodiment for producing a plurality of openings across the batch blanket simultaneously.

FIG. 6 is an enlarged view taken along lines 6—6 in FIG. 5 showing the details of one of the tapered hole producing members.

FIG. 7 is an enlarged top view taken along line 7—7 in FIG. 6 showing structural details of the hole producing member.

DETAILED DESCRIPTION

Figure 1:
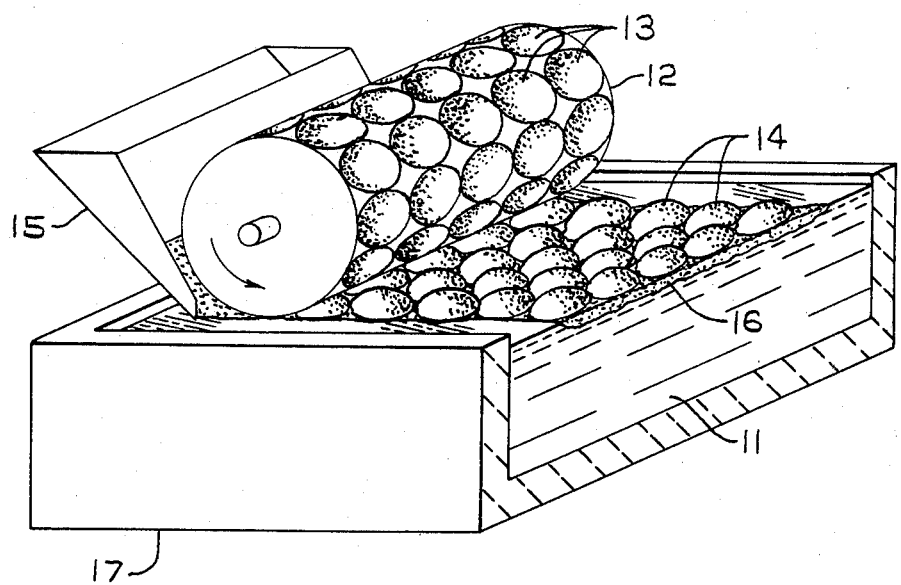
FIG. 1 is a schematic cut-away view of a feed inlet extension of a glass melting furnace wherein the batch blanket is being shaped to a series of hemispheres by a rotary molding means in accordance with one embodiment of the present invention.

The insulating affect of glass batch has been demonstrated by melting a hemisphere of batch having a six inch (15.24 centimeter) radius in which thermocouples were implanted at various distances from the surface.

Melting the hemisphere in a furnace at 2800° F. (1540° C.) produced a surface layer of foam, beneath which active melting appeared to take place in a 0.15 inch (3.8 millimeter) thick layer at the surface of the hemisphere. The temperature at the outside of this thin melting layer was 2050° F. (1120° C.) and on the inner side was 1500° F. (825° C.). An additional inch (2.54 centimeters) below the melting layer, the batch temperature was observed to be approximately 100° F. (38° C.), which was only slightly above room temperature. Dissection of partly melted hemispheres shows that a major portion of the batch in the interior remains unaffected, even though melting has taken place at the surface.

The following experiment was conducted to observe the influence of shape on the melting rate of batch. Glass batch of a standard commercial formulation was molded into five shapes: slab, cone, hemisphere, scalloped slab, and toroid. So that each of the shapes would represent a modification of a given area of a batch blanket, each of the shapes was proportioned so as to yield essentially the same base area and volume (and therefore mass) based on the base area and volume of a six inch (15.24 centimeter) radius hemisphere. Surface area varied from one shape to another. The precise dimensions are set forth in Table 1. The shapes were molded by tamping the batch, which was wetted with about 7 to 8 weight percent water, into a mold so as to compact the batch to a density of about 90 pounds per cubic foot (1.43 kg/liter) compared to a loose batch density of about 70 to 75 pounds per cubic foot (1.11 to 1.19 kg/liter). The slab at its base measuring 10.6 by 10.6 inches (27.0 by 27.0 centimeters) and 4 inches (10.16 cm) in height. The cone had a base diameter of 12 inches (30.5 cm) and a heiqht of 12 inches (30.5 cm). The hemisphere had a radius of six inches (15.24 cm). The scalloped slab had a base of 15.45 by 7.33 inches (39.2 by 18.6 cm) and a height of 2 inches (5.08 cm) above which extended three continguous, axially bisected cylinders, each having a radius of 2.57 inches (6.53 cm) and a length of 7.33 inches (18.6 cm). The toroid had an outer base diameter of 12.2 inches (31.0 cm) and an inner opening 1.9 inches (4.8 cm) in diameter at the base. The upper portion of the toroid was hemispherically rounded with a radius of 2.57 inches (6.53 cm) and rested on a base portion 2 inches (5.08) in height which was rectangular in cross-section. Each of these shapes was placed into a furnace at 2800° F. (1540° C.) and the time required to render the batch entirely to liquid was measured. Liquefied batch running off from the shapes was permitted to drain from the vicinity of the shape. The results are shown in Table I in the order of increasing melting rates.

TABLE I

| Shape | Base Area in$^2$ (cm$^2$) | Volume in$^3$ (liters) | Surface Area in$^2$ (cm$^2$) | Surface/Volume Ratio in$^{-1}$ (cm$^{-1}$) | Melting Time min. |
|---|---|---|---|---|---|
| Slab | 112.9 (728.2) | 451.6 (7.40) | 282.9 (1825) | 0.62 (0.25) | 37.3 |
| Cone | 113.1 (729.5) | 452.4 (7.42) | 252.9 (1631) | 0.56 (0.22) | 36.3 |
| Hemisphere | 113.1 (729.5) | 452.4 (7.42) | 226.2 (1459) | 0.5 (0.20) | 35.8 |
| Scalloped slab | 113.25 (730.5) | 454.6 (7.46) | 330.9 (2134) | 0.73 (0.29) | 34.5 |
| Toroid | 116.9 (754.0) | 457.9 (7.51) | 267.4 (1725) | 0.59 (0.23) | 27.3 |

It can be seen that, contrary to what might be expected, the melting rate did not correspond to surface area of the shapes. For example, the slab shape, in spite of having the second largest surface area, exhibited the slowest melting time. On the other hand, the toroid, with only the third largest surface area, exhibited a melting time significantly shorter than any of the other shapes. It is believed that these results may be explained in terms of relative run-off areas provided by the shapes, with the superior performance of the toroid apparently being due to the fact that run-off from a toroid shape occurs in two directions: toward the central opening, and down the outer periphery. If a conventional batch blanket most closely resembles the slab shape, it may be concluded that contouring the batch blanket to more closely resemble any of the other shapes, preferably the toroid, would result in improvements in melting rate comparable to those shown in Table I. Because of their resemblance to the cone shape, it may be assumed that tetredral or pyramidal shapes would also yield comparable improvements in the melting rate. Also, the scalloped slab shape suggests the use of discrete cylndrical or semi-cylindrical shapes or the like. Of course, other, less regular or more complex geometric shapes may also be appropriate so long as they provide increased run-off area.

The most straightforward adaptation of the present invention to commercial glass melting processes is to form aggregates of glass batch to the desired shape at a batch preparation station separate from the melting furnace. The shaping may be carried out simply by pressing the wetted batch into a mold, but for full-scale production, it is preferred that a briquetting type process be used such as those shown in U.S. Pat. Nos. 2,214,191; 2,578,110; 3,233,022; and 4,023,976. Unlike these prior art briquetting methods, wherein the object is to produce a large number of small agglomerates having a cumulative large surface area, the present invention entails the production of relatively massive aggregates having sloped surfaces which will have a relatively extended life span within a melting furnace. It would be preferred that the aggregates present sloped surfaces at a substantial elevation above the surface of the molten glass in a melting furnace for at least one half of the residence time of the last melted increment of batch. For example, batch is typically reduced to liquid in a large commercial flat glass furnace in a maximum time on the order of about thirty minutes, in which case it would be preferred that the sloped run-off surfaces of the aggregates persist for at least fifteen minutes in such a furnace. Thus, the agglomerates of the present invention will be considerably larger in size than the briquettes or pellets of glass batch which have been previously proposed. It is preferred that the aggregates of the present invention each have a base area of which the minor dimension is at least 10 centimeters, up to about 25 centimeters. A similar range is preferred for the height of each aggregate. Since the lower portion of each aggregate will be submerged beneath the surface of the molten glass in the furnace, the shape of the lower portion is not critical for the purposes of the present invention and may be flat or irregular, irrespective of the shape of the upper portion of the aggregate.

In any of the embodiments of the present invention, it has been found that glass batch moistened with water to a moisture content of about five percent to ten percent by weight, preferably seven to eight percent, has sufficient self-adhesion to be molded into shapes having sufficient structural integrity for the purposes of the present invention. Instead of, or in addition to, some or all of the water, other binding aids such as caustic soda solution or sodium silicate solution may be employed. Also, molding may be aided by the use of known organic binding agents. Molding glass batch to a self supporting shape entails compacting at least a surface portion of the shape. Sufficient compaction, expressed as percentage increase of density, is generally in the range of ten percent to forty percent, preferably fifteen percent to thirty percent. In some cases it may be sufficient for the compaction to take place in surface portions only of the agglomerate (e.g., the first one to five centimeters) since a compacted outer shell may contain a non-compacted quantity of batch in the interior of the aggregate.

The data herein regarding compaction and moisture content pertain particularly to the following flat glass batch formula which is also the formula employed in the examples of Table I:

TABLE II

| Ingredient | Parts by Weight |
|---|---|
| Sand | 1,000 |
| Soda Ash | 313.5 |
| Limestone | 84 |
| Dolomite | 242 |
| Salt Cake | 14 |
| Rouge | 0.75 |
| Coal | 0.75 |

The above batch formula is a typical commercial flat glass batch formula, but the principles of the present invention are applicable to the many possible variations in batch formulas, not only for flat glass, but also for fiber glass, container glass, silicate melting, and others with only slight, if any, variations from the specific examples set forth herein. By following the general teachings of the present invention, producing a structurally stable aggregate of any conventional glass batch formula will be well within the ordinary skill of the person in the art.

Figure 2:
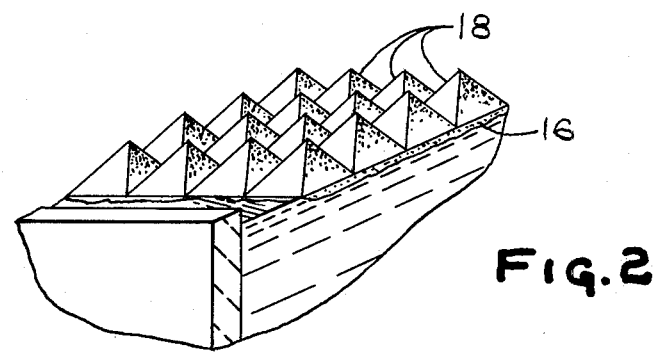
FIG. 2 is a schematic cut-away view of a batch blanket shaped to a series of pyramids.
Figure 3:
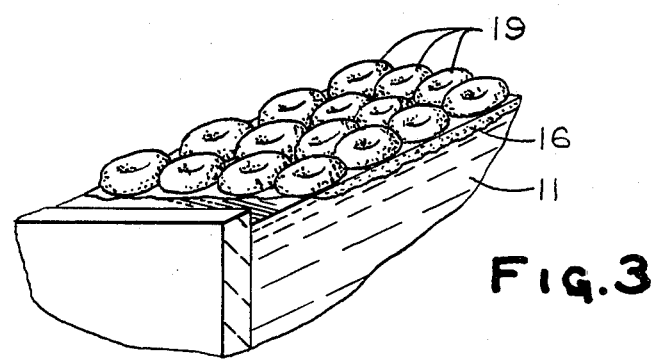
FIG. 3 is a schematic cut-away view of a batch blanket shaped to a series of toroids.
Figure 10:
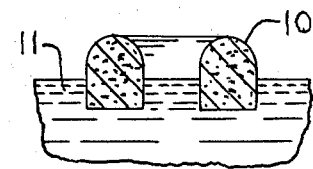
FIG. 10 is a cross-sectional view of a typical configuration for the preferred toroid shaped aggregate.

The shaped aggregates may be fed to a melting furnace by means of a reciprocating tray type feeder with a plurality of the aggregates side by side so as to form an array of aggregates floating on the pool of molten glass whose appearance would resemble those in FIGS. 1, 2 and 3. As is evident from the drawings, the side-by-side arrangement of aggregates is such that each aggregate's major dimension is no more than a minor portion of the width of the batch layer. FIG. 10 depicts a cross-sectional view of a preferred example of a discrete toroidal aggregate 10 floating in molten glass 11.

Another embodiment of the invention is depicted schematically in FIG. 1. There, shaping of the glass batch aggregates takes place at the inlet to the melting furnace itself. This could be effected by means of a reciprocating press type molding apparatus, but the preferred means shown in FIG. 1 is a continuous rotating mold 12. The rotating mold is provided with a plurality of concavities 13 corresponding to the shape desired to be impressed into the batch blanket. Depending upon the compactability of the wetted batch formula, the downward pressure of the rotating mold acting against the buoyant force of the batch may be sufficient to compact the batch and form the aggregates, which in FIG. 1 are hemispheres 14. In other cases, the pressure required for compaction may be produced between the rotating mold 12 and a stationary rigid member such as the delivery chute 15 between which the batch is pinched. The rotating mold also serves as a batch pusher to feed the contoured batch blanket 16 into the main portion of the furnace from the inlet extension 17.

FIG. 2 shows a variation on FIG. 1 wherein the contours imparted to the top surface of the batch blanket 16 by a rotating molding means are in the form of a plurality of pyramids 18. Likewise, FIG. 3 depicts another variation wherein the rotating mold produces a plurality of toroids 19. These are merely a few examples of the beneficial shapes which may be imparted to the surface of the batch blanket as discussed above.

Another embodiment of the invention is depicted in FIGS. 4 through 9. In this embodiment slopes for ablation melting enhancement are provided by making holes in a batch blanket, and has the advantage that it may be employed in conjunction with existing conventional batch feeding apparatus. The ready adaptability of this embodiment to existing glass melting facilities renders it the preferred mode of the invention on the basis of practicality and an example of an apparatus by which this mode may be implemented will be described hereinafter.

Figure 4:
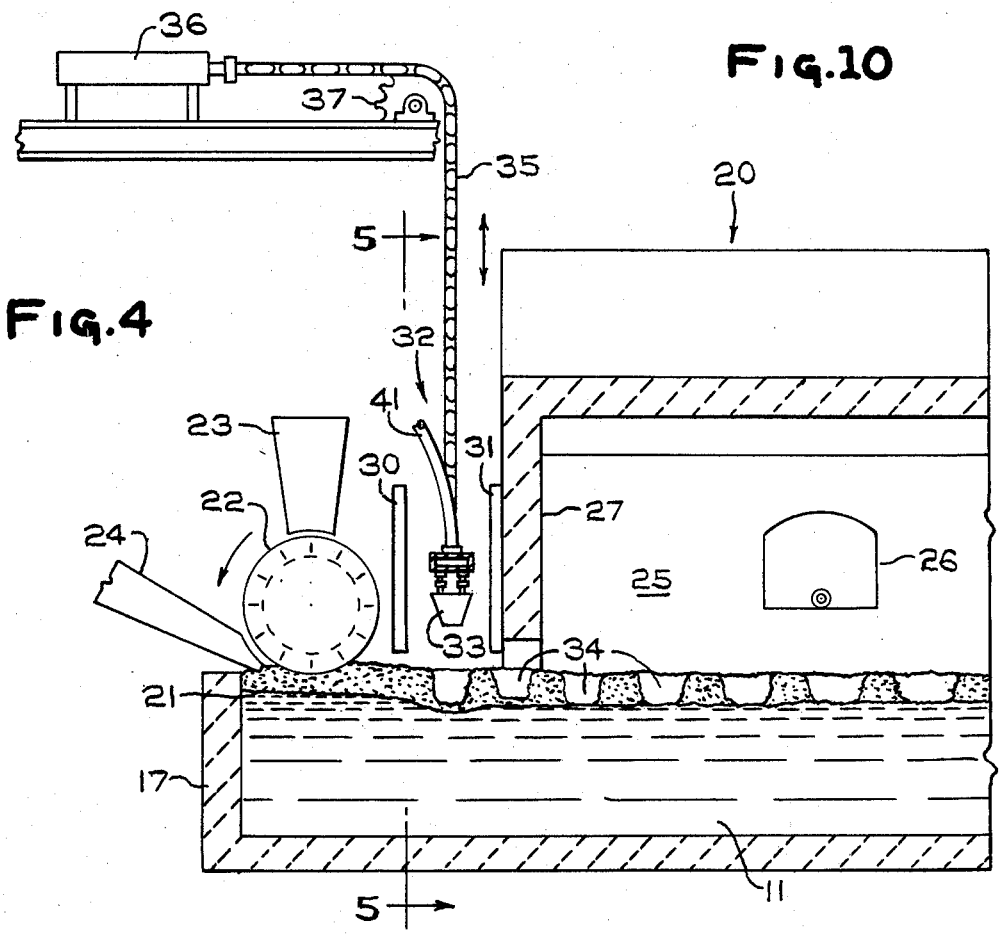
FIG. 4 is a cross sectional side view of an inlet end of a glass melting furnace incorporating means for producing openings in a batch blanket in accordance with a preferred embodiment of the present invention.
Figure 8:
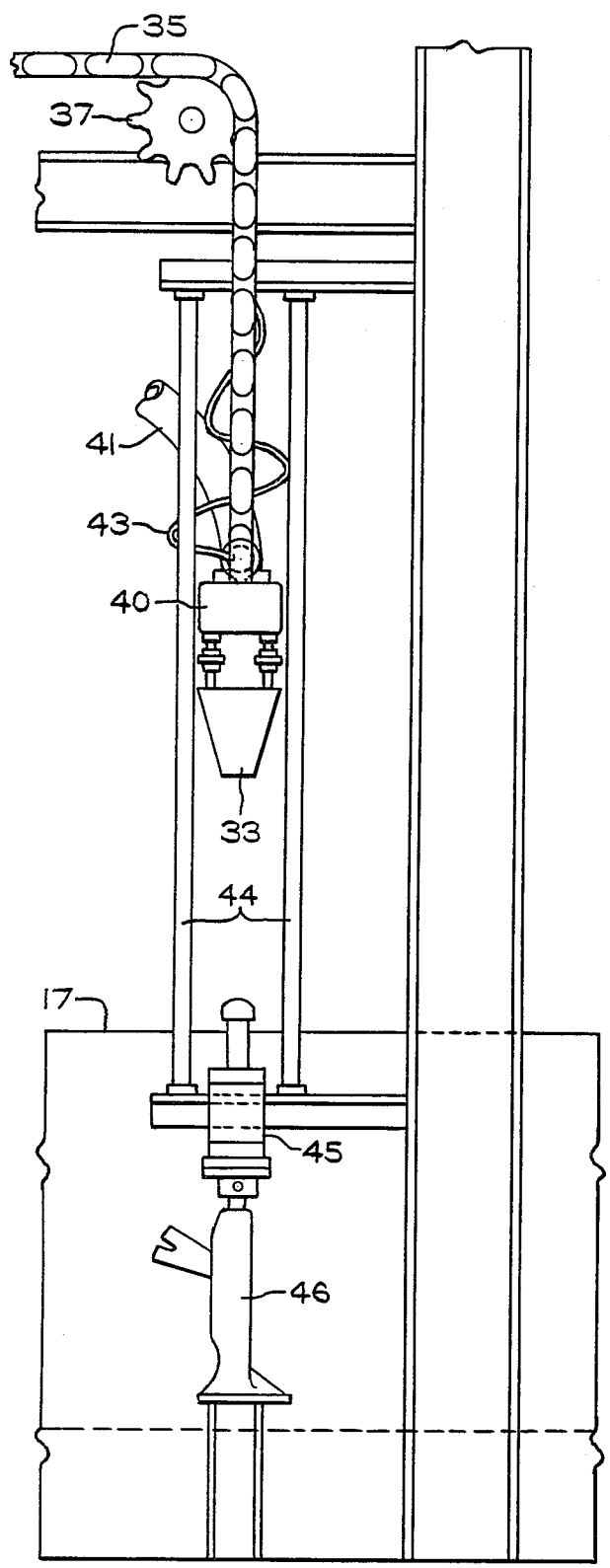
FIG. 8 is a side view of a portion of the inlet extension of the furnace shown in FIG. 5 showing details of the hole producing apparatus of a preferred embodiment.

In FIG. 4 there is shown schematically the inlet end of a typical continuous glass melting furnace 20 having an inlet extension 17 at which a batch layer 21 is fed onto the surface of a pool of molten glass 11. The glass batch may be fed by means of a rotary feeder 22 of the type shown in U.S. Pat. No. 2,829,784, or any other type of feeder, such as the reciprocating tray type, may be employed. As shown in FIG. 4, the rotating feeder is provided with batch from a chute 23 and with cullet from a chute 24. The batch layer extends into the main furnace cavity 25, usually at least as far as first burner port 26, which may be one of typically four to eight burner ports in a crossfired, periodically reversing, regenerative firing system as is well known in the art. The novel aspect of FIG. 4 is a batch hole making device designated generally as 32 situated between the batch feeder and the front wall 27 of the main furnace cavity, in this case being located between shade coolers 30 and 31. The hole making device 32 is comprised of at least one tapered member 33 provided with vertical reciprocation for insertion into the batch layer at intervals so as to produce a series of spaced holes 34 in the batch layer. The vertical reciprocation may be provided, for example, by means of a chain 35 connected to a pneumatic cylinder 36 by way of a sprocket 37. Details of the hole making device are shown in FIGS. 5 and 8. The tapered members preferably are fabricated from stainless steel, but mild steel, porcelain coated steel, or ceramics may also be suitable.

In FIG. 5 it can be seen that a plurality of the tapered members 33 are supported on a beam 40 extending across the width of the inlet extension of the furnace. The beam 40 may be comprised of a hollow tube closed at the ends and provided with a supply of pressurized air by way of a supply duct 41. The air is supplied to the interior of each of the tapered members 33 by way of hollow tubular legs 42 which connect the tapered members 33 to the beam 40. The air circulates through the tapered members 33 in order to enable them to withstand the high temperatures to which they are exposed. Other coolants such as water could be used instead of air. Safety cables 43 are connected to the beam 40 as a precaution in the event of failure of the pneumatic cylinders 36. At each end of the beam 40 the beam is retained against swinging in the direction of glass travel by a pair of guide rods 44. Additional details of the guide rods 44 are shown in the side view of FIG. 8. A shock absorber 45 mounted on a jack 46 for height adjustment is provided on each side of the inlet extension 17 in alignment with each end of the beam 40 to cushion the fall of the hole maker when lowered into the batch layer 21.

Turning now to FIGS. 6 and 7, details of the construction of a preferred embodiment of the tapered members 33 may be seen. The tapered member shown is in the form of an inverted, truncated pyramid, but could instead be a cone, tetrahedron, or the like. The tapered member 33 has an outer casing formed by side walls 50, a top plate 51 and a bottom plate 52. The interior is provided with a pair of partition plates 53 so as to direct the cooling air from the pipes 42 downwardly in the central portion to the vicinity of the bottom plate 52 and then upwardly along side walls 50. The cooling air then escapes through a plurality of openings 54 in the top plate 51.

Figure 9:
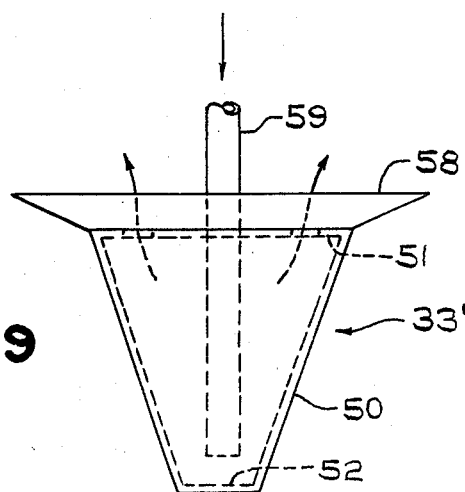
FIG. 9 depicts an alternate embodiment of a tapered hole producing member including a flaired upper portion.

In FIG. 9 there are shown two optional modifications to the tapered member 33'. A flared skirt 58 may be provided around the top of the tapered member 33' to enhance the compacting effect of the tapered member on the batch. This may permit closer spacing of the holes in the batch layer or deeper penetration of the member into the batch while preventing up-welling of the batch between the holes. The other variation shown in FIG. 9 is a simplified air cooling system wherein the tapered member 33' is supported by means of a single air supply tube 59 which extends into the interior of the tapered member to a point near the bottom plate 52, thereby eliminating the need for interior baffles. As in the previous embodiment, the air escapes through openings in the top plate 51.

The tapered members 33 are adapted to force the batch aside and to thus compact the batch around each hole being made as the member is lowered into the batch layer. A minor amount of batch is pushed downwardly by the blunt end of the tapered member and is also compacted. Although it may be preferred in some cases to eliminate this downward pushing by providing the tapered member with a pointed tip, the use of the blunt end is generally considered advantageous in that it prevents the tapered member from coming into direct contact with the highly corrosive molten glass, and prevents molten glass from sticking to the tapered member. Thus, the materials requirements and cooling needs for the tapered members are reduced.

The slope on the sides of the tapered members is selected as a trade-off between compaction and ease of penetration. A relatively flat angle between the opposite sides of each tapered member maximizes the compacting effect on the batch but increases the amount of force required to penetrate the batch layer. Conversely, a narrow included angle between the opposite sides optimizes ease of penetration but yields little compaction in the batch. It is also believed that a steep slope on the sides of a hole produced in the batch layer may be preferred in some cases due to a radiation trapping effect. Accordingly, it is preferred that the included angle between the opposite sides of each tapered member 33 be at least 30 degrees, up to about 90 degrees. In other words, the holes produced would have sloping sides 15 degrees to 45 degrees from vertical.

The tapered members are preferably designed to penetrate substantially through the entire thickness of the batch and sometimes to a depth even greater than the thickness of the batch layer. Due to the tapered shape, greater penetration yields larger holes in the batch and a greater degree of compaction. However, some of the batch which is pushed downwardly by the blunt tips may spring back due to the buoyant effect of the molten glass after the tapered member is withdrawn. It has been found that this portion of the batch melts quickly, leaving an open bottom hole through the batch layer in communication with the molten glass beneath, thus providing a readily available drain for liquified batch to run off from the top of the batch layer. For example, a pyramidal tapered member as shown in the drawings has been found to operate satisfactorily when dimensioned as follows: 12 inch (30.5 cm) square top plate, 3 inch (7.6 cm) square bottom plate, and 12 inches (30.5 cm) high. With an eight inch (20.3 cm) thick batch layer, such a tapered member has been inserted from eight inches (20.3 cm) to twelve inches (30.5 cm) from the top surface of the batch.

Even when only a few holes are made in batch layer, surprisingly pronounced improvements have been observed. However, in order to optimize the improvements, it is preferred to maximize the number of holes. An upper limit on the number of holes is reached, however, when the spacing between holes is reduced to the point where compaction can not wholly account for displacement of batch from the holes, in which case batch is forced into higher mounds around the holes, or previously made holes are caused to collapse due to horizontal displacement of batch. Therefore, it is preferred that the total area of the holes at the surface plane of the batch layer constitute at least two percent but no more than twenty percent of the total batch area. For example, with the pyramidal tapered member twelve inches square at the top as described above, it has been found satisfactory to space the holes in an eight inch (20.3 cm) thick blanket at a twenty inch (50.8 cm) spacing center-to-center in both directions. When a plurality of holes are made simultaneously across the width of the batch blanket as in the embodiment which has been described herein, spacing in the transverse direction need not be as great as that in the longitudinal direction since the inserted tapered members prevent collapse of adjacent holes due to horizontal displacement of batch. Preferably, spacing of the holes longitudinally is controlled by automatic timing of the insertion of the tapered members.

The specific embodiments and examples set forth herein have been disclosed for the sake of illustration and to describe the best modes known by applicant for practice of the invention, but it should be apparent that other variations and modifications known to those of skill in the art may be applied to the present invention without departing from the spirit and scope of the invention as set forth in the claims.

I claim:

1. In a method of melting glass wherein particulate glass batch materials are fed onto a pool of molten glass within a heated enclosure where the batch floats as a layer on the pool of molten glass until rendered liquid by the heat within the enclosure, the improvement comprising: creating at spaced intervals across the batch layer a plurality of tapered holes having sloped surfaces of compacted batch and extending substantially through the thickness of the batch layer without substantially increasing the thickness of the batch layer.

2. The method of claim 1 wherein the tapered holes are created by periodically inserting a tapered member into the batch layer.

3. The method of claim 2 wherein a plurality of tapered members spaced across the width of the batch layer are periodically inserted into the batch layer to create an array of said holes in the batch layer.

4. The method of claim 1 or 3 wherein the holes comprise at least two percent of the area covered by the batch layer.

5. The method of claim 2 or 3 wherein the opposite sides of each tapered member form an angle from 30° to 90°.

6. The method of claim 5 wherein each tapered member has a shape selected from the group consisting of an inverted cone, an inverted tetrahedron, and an inverted pyramid.

7. The method of claim 1 wherein the surfaces of the holes are compacted at least ten percent relative to the density of loose batch as fed to the heated enclosure.

8. A method of melting glass comprising the steps of:
compacting particulate glass batch materials by molding into aggregates, each aggregate having sloped upper surfaces and a minimum base dimension of at least ten centimeters;
depositing a single layer of the molded aggregates onto a pool of molten glass contained within a glass melting furnace to form an array of the aggregates floating on the surface of the pool with the sloped upper surfaces above the molten glass level; and
heating the array of aggregates so as to cause liquefied batch to run off the sloped upper surfaces into interstices between the aggregates.

9. The method of claim 8 wherein the aggregates are formed with a height of at least ten centimeters.

10. The method of claim 8 wherein the molded aggregates are formed substantially as cones, pyramids, tetrahedrons, spheres, or hemispheres.

11. A method of melting glass wherein loose, particulate glass batch materials are fed into a pool of molten glass in a melting furnace to form a layer of batch floating on the molten glass and the layer is progressively advanced in a forward direction from an inlet location to a melting location, the improvement comprising: compressing the batch at the inlet location with shaping means to mold the upper surface of the batch layer into an array of compacted mounds and depressions, each mound having sloped surfaces above the molten glass level and having its major dimension equal to no more than a minor portion of the width of the batch layer, and advancing the mounds to the melting location where liquefied batch runs off the sloped surfaces into the depressions.

12. The method of claim 11 wherein the compression of the batch is effected between downward force of the shaping means and the buoyant force of the molten glass on the batch layer.

13. The method of claim 11 wherein the compression of the batch is effected between the shaping means and a rigid member on the opposite side of the batch.

14. The method of claim 11 wherein each mound is formed with the minor dimension at its base of at least ten centimeters.

15. The method of claim 11 wherein the depressions are formed to extend substantially through the thickness of the batch layer.

16. The method of claim 11 wherein the mounds are shaped substantially as cones, pyramids, tetrahedrons, spheres, or hemispheres.

17. The method of claim 8, 11, or 1 wherein the batch is wetted with about 5 to 10 percent by weight water prior to being shaped.

* * * * *